United States Patent
Vatne et al.

(10) Patent No.: US 6,575,692 B2
(45) Date of Patent: Jun. 10, 2003

(54) METHOD OF UNLOADING OF SOLID SUBSTANCE HAVING HIGH DEGREE OF WATER CONTENT

(75) Inventors: Per Vatne, Kristiansand (NO); Tore Hansen-Tangen, Kristiansand (NO)

(73) Assignee: Pevatec AS (NO)

( * ) Notice: Subject to any disclaimer, the term of this patent is extended or adjusted under 35 U.S.C. 154(b) by 0 days.

(21) Appl. No.: 09/891,097

(22) Filed: Jun. 25, 2001

(65) Prior Publication Data

US 2002/0015621 A1 Feb. 7, 2002

Related U.S. Application Data (63) Continuation of application No. PCT/NO99/00079, filed on Mar. 5, 1999.

(30) Foreign Application Priority Data

Dec. 23, 1998 (NO) .................................................. 986101

(51) Int. Cl.[7] .............................................. B63B 27/00
(52) U.S. Cl. .................................... 414/803; 414/137.7
(58) Field of Search ............................. 414/803, 137.7, 414/142.2

(56) References Cited

U.S. PATENT DOCUMENTS

| | | | |
|---|---|---|---|
| 3,631,997 A | 1/1972 | Konig | 214/152 |
| 4,019,641 A * | 4/1977 | Merz | 406/116 |
| 4,103,792 A * | 8/1978 | Puretic | 414/803 |
| 4,829,923 A * | 5/1989 | Copson et al. | 114/27 |
| 5,501,563 A * | 3/1996 | Grathoff | 414/137.1 |
| 6,368,029 B1 * | 4/2002 | d'Aquin | 406/197 |

FOREIGN PATENT DOCUMENTS

| | | |
|---|---|---|
| GB | 2141673 A | 1/1985 |
| JP | 53/91288 | 10/1978 |
| JP | 8302729 A | 11/1996 |

* cited by examiner

*Primary Examiner*—Joseph A. Dillon
(74) *Attorney, Agent, or Firm*—Candice J. Clement, Esq.; Heslin, Rothenberg, Farley & Mesiti, P.C.

(57) ABSTRACT

A method for loading and unloading of a solid substance having a high degree of water content from a cargo hold of a bulk carrier is disclosed. The degree of water content of the solid substance is such that a layer of liquid is formed above the solid substance. In accordance with the method, a predetermined volumetric ratio of solid substance and water is pumped out of the cargo hold by a pump that is seated on a float freely movable on the layer of liquid, at the same time as water is fed into the cargo hold at a volumetric rate substantially the same as the volumetric rate of water being pumped out.

4 Claims, 6 Drawing Sheets

METHOD OF UNLOADING OF SOLID SUBSTANCE HAVING HIGH DEGREE OF WATER CONTENT

CROSS REFERENCE TO RELATED APPLICATIONS

This application is a continuation of co-pending International Patent Application Number PCT/NO99/00079, filed Mar. 5, 1999, and claims priority from Norwegian Patent Application Number 19986101, filed Dec. 3, 1998. The entire disclosure of each of the prior applications is incorporated herein b reference.

FIELD OF THE INVENTION

The present invention relates to a method for unloading a solid substance having a high degree of water from a cargo hold of a bulk carrier such as a ship or barge. The method utilizes a pump seated on a float that is freely movable on a layer of liquid that is formed above at least portions of the solid substance due to its high degree of water content. The invention also relates to a method of loading a solid substance having a high degree of water content into a cargo hold of a bulk carrier, as well as to a float having a pump station seated thereon, for use in the loading and unloading of a solid substance having a high degree of water content into and from a cargo hold of a bulk carrier.

BACKGROUND OF THE INVENTION

In a continuously increasing extent, a need is present to reclaim land areas in order to make active use of the land. For that purpose, large volumes of substance, like sand, is transported from one land area to another by use of barges. One example is reclamation of land areas previously being sea areas. This is i.a. true for the new airport near Osaka in Japan. Another example is reclamation of land for expansion of city areas like in Singapore. Yet an example is desert sand being transported by barges from Sahara to the Canary Islands for developing beaches or establishing sand beaches on locations previously not having such.

In order to increase the productivity for these development projects, the thought of exploiting available bulk carriers as transportation means has been introduced. The present concept does introduce an effective way to load and unload a ship. Especially seabed substance, and in particular, though not exclusively, sand is exploited for these projects.

SUMMARY OF THE INVENTION

According to one embodiment of the present invention, a solid substance having a high degree of water content, is unloaded from a cargo hold of a bulk carrier by a pump seated on a float that is freely movable over a layer of liquid that is formed over the solid substance due to the high degree of water content of the solid substance.

In accordance with the principles of the invention, solid substance and water are pumped out of the cargo hold in a predetermined volumetric ratio and simultaneously, water is fed into the cargo hold at a volumetric rate that is substantially the same as the water volume being pumped out with the solid substance. Preferably, the volumetric ratio of water and solid substance being pumped out of the cargo hold is between 70:30 and 60:40.

The pump suction is suitably displaceable outwardly and inwardly in the vertical direction in respect of the float, in order to adjust and adapt itself according to the optimum ratio of the solid substance and the water in the discharged mixture.

Further, a method for loading as stated in the preamble of this specification is provided, which is distinguished in that during loading, the water is pumped outboard again from the cargo hold by the pump on the float at substantially the same volumetric rate as the water arriving inboard, and the water layer is kept deeper than during unloading in order to let the solid matters settle and as little as possible of the solid matters are allowed to pass outboard again with the water being pumped outboard.

Still further, a float as stated in the preamble of this specification is provided, which is distinguished in that at least the suction of the pump station can to be elevated or lowered in respect of the float. As an alternative, the entire pump station can be elevated or lowered in respect of the float. The float can have a stationary guiding column to which a beam, that can be elevated or lowered, carrying the entire pump station, is provided. The pump station can include a motor, which is in driving connection to a pump. Further, the motor can be connected to the pump via a transmission and a support. The pump can per se be a standard mud or sand pump.

The entire float, the accompanying pump station, pipelines and hoses are an easy task to assemble on existing bulk carriers. The equipment can be designed to the actual dimension of the ship. The installation proper does not require permanent modifications or interventions in the hull of the ship. Normally one of the for-and-aft sides of the ship will be dedicated for loading and the opposite for-and-aft side for unloading.

BRIEF DESCRIPTION OF THE DRAWINGS

Other and further objects, features and advantages will be apparent from the following description of a preferred embodiment of the invention, which is provided for the purpose of illustration only and the invention is not intended to be limited thereto. The embodiment is further described by reference to the appended drawings, wherein.

DETAILED DESCRIPTION OF A PREFERRED EMBODIMENT OF THE INVENTION

Figures 1A, 1B:
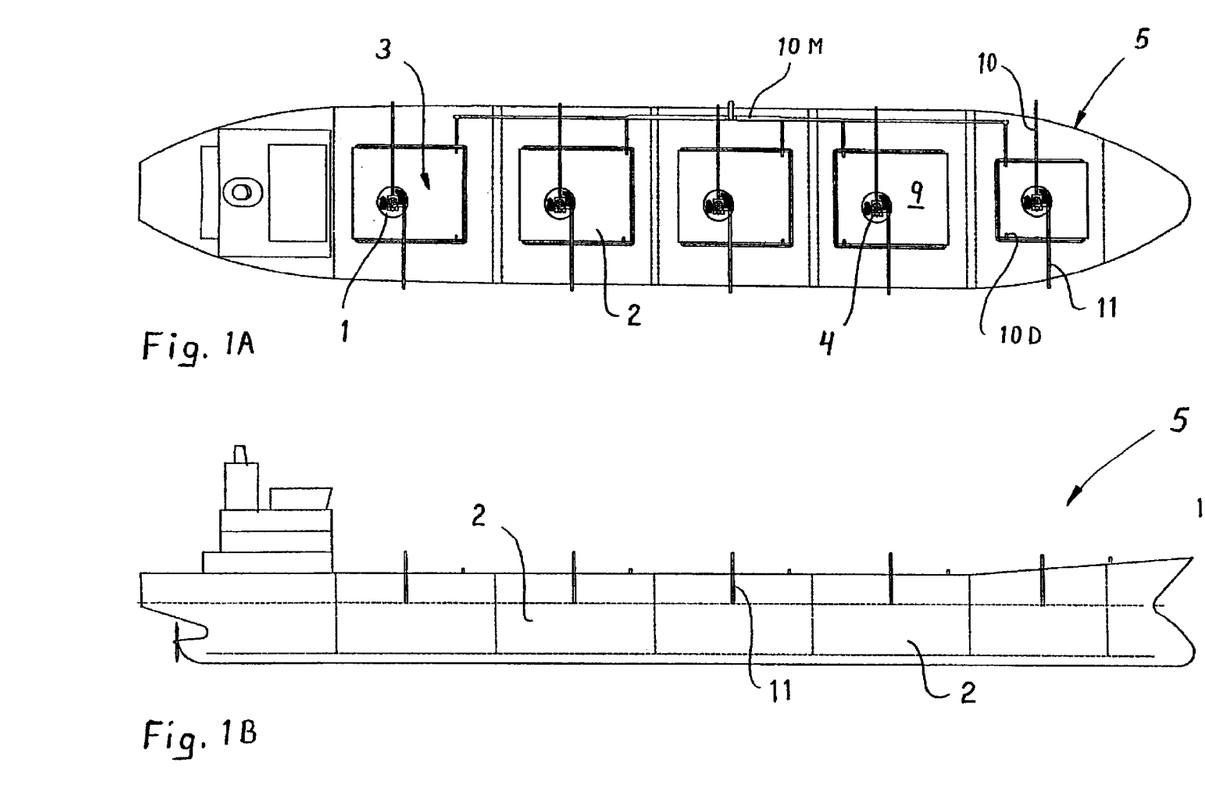
FIGS. 1A–1C illustrate schematically a typical bulk carrier which is well suited for use with the present invention.
Figure 1C:
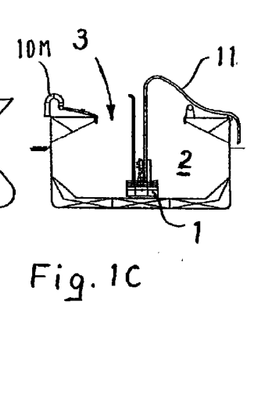

FIG. 1A illustrates a typical bulk carrier 5 viewed from above. In this embodiment, the bulk carrier is a ship having a number of cargo holds 2 for receipt of a solid substance and water, such as, for example, sand and seawater. FIG. 1B shows the bulk carrier from the for-and-aft side and FIG. 1C shows a cross sectional vie through the cargo hold in the ship's hull. Each cargo hold has an opening 3 in the deck level of the ship, wherein a float 1 having a pump station seated thereon, is deployed. The float is displaceable on a water surface 9 in the cargo hold and when the hold is filled with a solid substance having a high degree of water content, the float is movable only within the boundaries of its as associated opening. As the cargo hold is unloaded however, the float is able to move over the surface of the water layer covering the solid substance.

When solid substance and water are being loaded into the cargo hold, a loading manifold 10M is provided. The manifold branches off the respective cargo hold and may include a number of outlets 10D that are conveniently located around the opening 3. As shown in the embodiment of FIG. 1B, each cargo hold includes four outlets.

Figure 2:
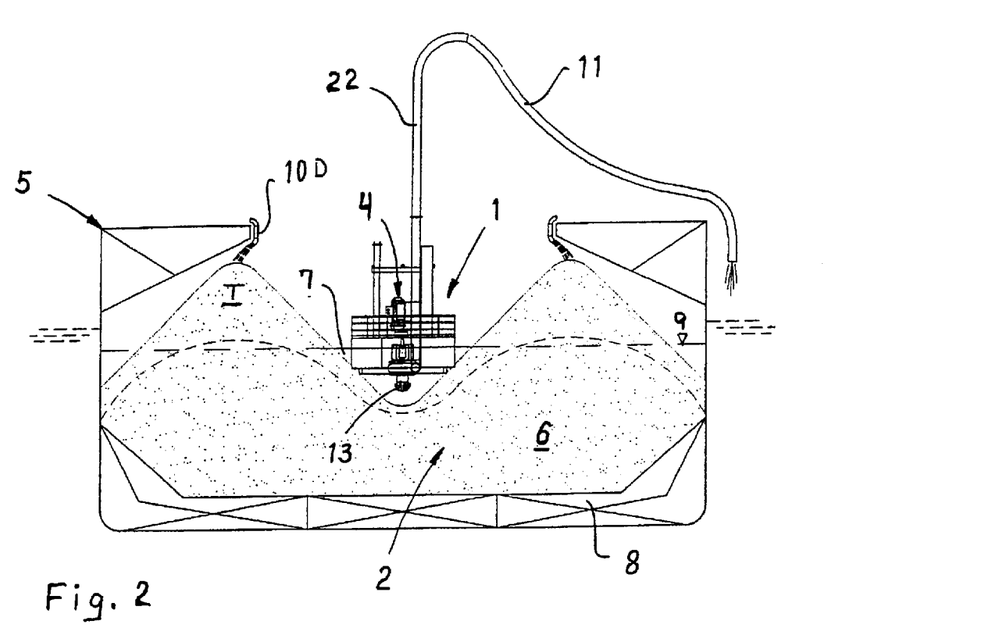
FIG. 2 illustrates a cross section through a cargo hold of a ship hull that is filled with sand and water, and a float deployed on the layer of water.

FIG. 2 shows a cargo hold 2 during the final stage of filling with a mixture of sand 6 and water. Due to the difference in specific gravity of sand and water, an increasingly more compact layer of sand is formed the closer to the bottom 8 of the ship 5 one comes. Correspondingly, the sand 6 comprises increasingly more water the more one approaches the water surface 9. On top a water layer 7 is formed and the depth of this is adapted to the draught of the float 1 and those conditions that are favourable during loading, respectively unloading. The extent of crest formation is depending of the particular substance that is carried onboard. The rule is that the more coarse the sand is, the steeper and higher crests T. With fine sand and sand having a content of mud, the crests T will be far less and in some situations totally absent and a pretty smooth surface layer is formed.

In order to control the float 1 on the water surface 9, two traction winches 24 can be installed on the edge of the hatch opening 3. One can be located in the transversal extending edge of the hatch opening 3 and one in the longitudinal extending edge. The winch wires are running in closed loops and pass over turn sheaves 25 at the opposite side of the hatch opening 3 and having both wire ends tied to the float 1. By alternatingly coordinating the pull in and pay out of the wires by means of the two winches, the float 1 can be positioned wherever within the cargo hold 2. Like the horizontal arrows R show, the float 1 is controllably movable on the water layer 7.

Figure 3A:
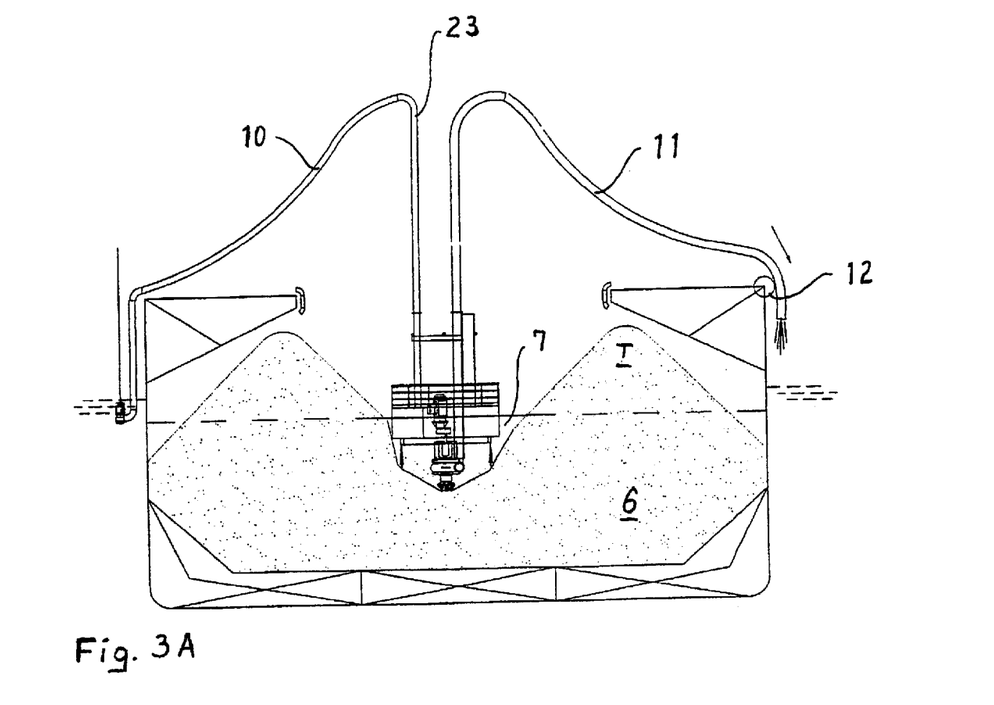
FIGS. 3A–3C illustrate the same as FIG. 2, but in three phases of the unloading operation wherein the float including the pump station work with the loosening and suction of the matter for emptying the cargo hold.
Figure 3B:
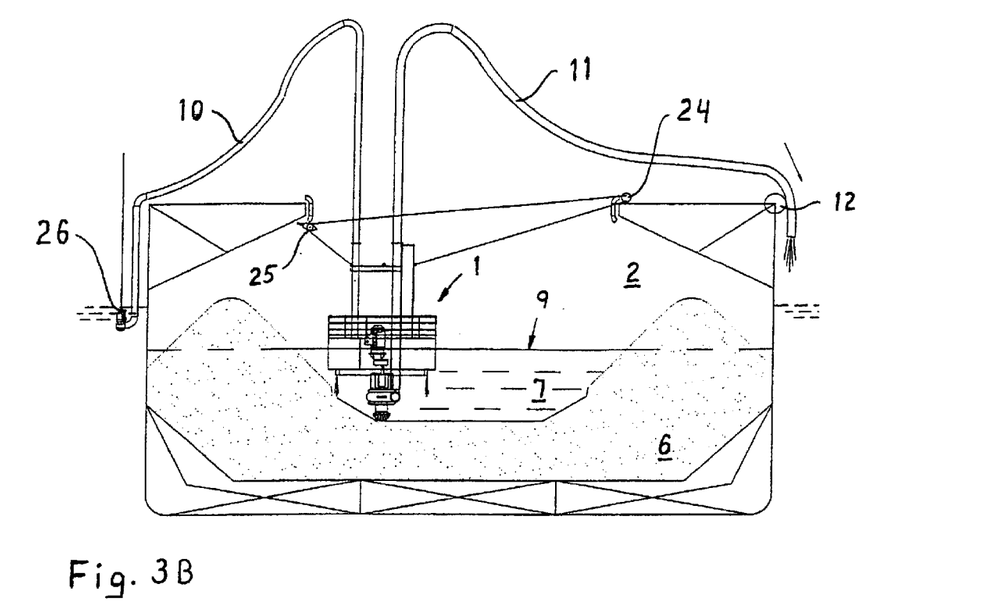
Figure 3C:
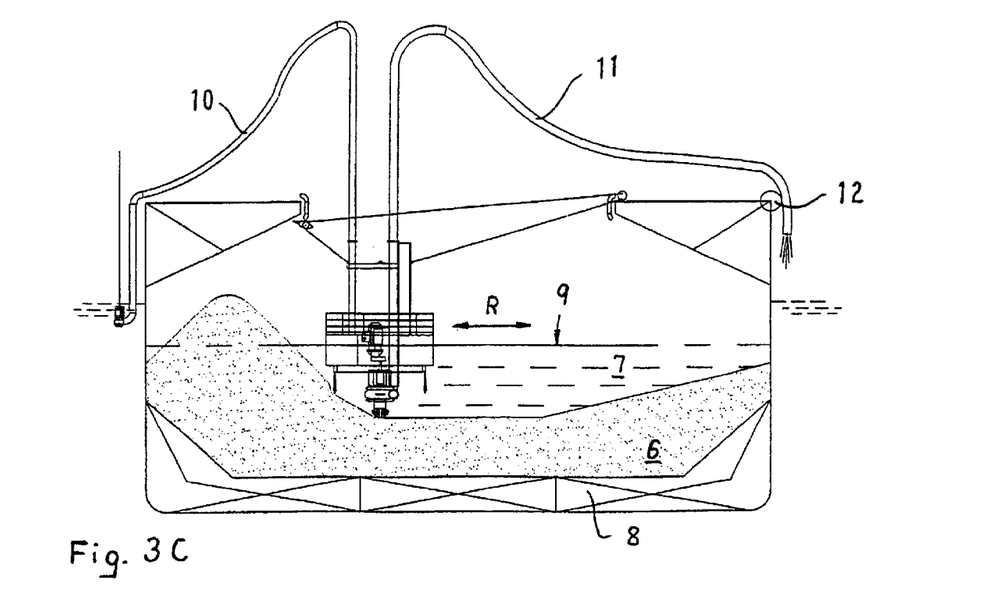

As presented in FIGS. 2 and 3, a flexible hose 10 and a vertical pipeline 23 are-included and are fixed to the float 1. The pipeline 23 bends approximately 90 degrees toward the for-and-aft side of the ship 5 and is dedicated for replenishing of water. One hose 11 for discharging of a mixture of sand 6 and water is provided on the opposite side. A rigid drenching pipe 22 from the pump station 4 extend initially substantially vertically over the deck level and bends approximately 90 degrees and is oriented towards the discharge side of the ship 5. The discharge hose 11 is flexible and is arranged to the free end of the discharge hose 22. The hose 11 is mobile and can, as the cargo hold 2 being emptied, be laid onto one or more sheaves 12 which the hose 11 will run over. The vertical pipes 22 and 23 limit the movements of the float 1 within the hatch opening 3.

The replenishing pipe 10 can, as an alternative, be stationary and be spaced well apart from the suction 13 of the pump. The pipeline 10 can be supplied with water by means of a submerged pump 26 or alternatively, the pipe can be fed from the ship ballast system if this is of sufficient capacity.

Figure 4:
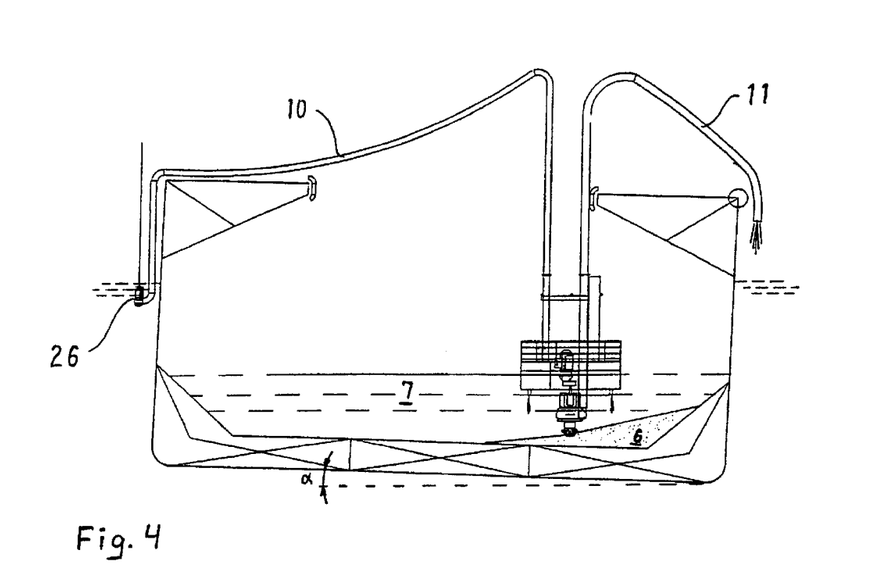
FIG. 4 illustrates again the same as FIGS. 2 and 3, but in the last phase of the unloading operation in which the ship is tilted and nearly all the sand is unloaded.

FIG. 4 shows a situation when the cargo hold 2 is nearly emptied for sand 6. In order to remove as much as possible of the sand 6, the ship can be trimmed sideways, for example by an angle α of approximately 2 degrees as indicated in FIG. 4. Thus the remaining substance is concentrated towards the one for-and-aft sides of the cargo hold 2 where the suction 13 of the pump station 4 is located.

Figure 5:
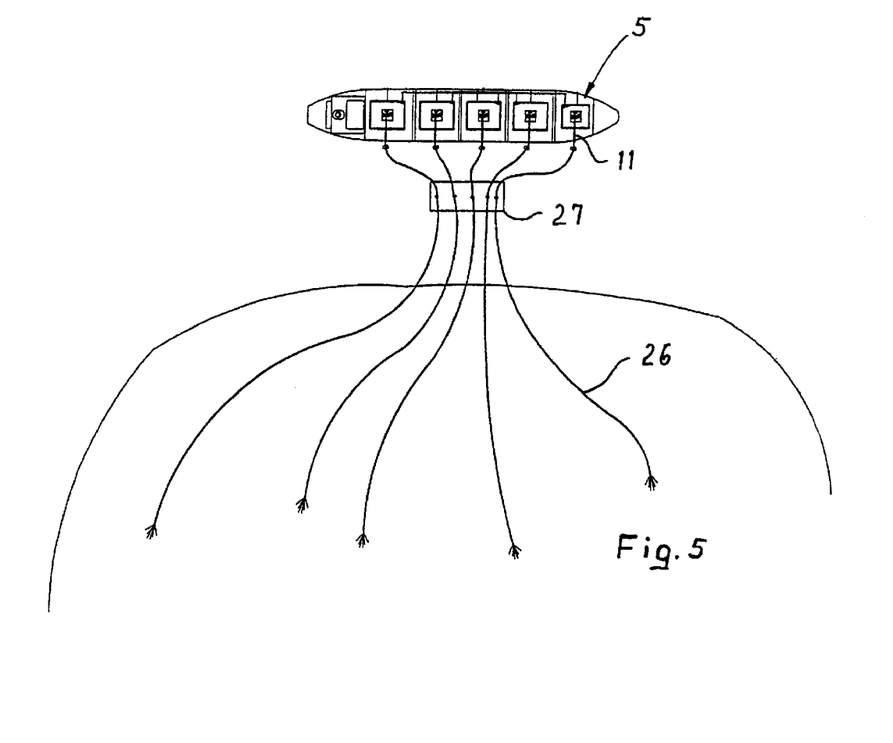
FIG. 5 illustrates remote discharging of the solid substance from the ship by means of extended transportation hoses and another pump station.

The equipment is otherwise well suited for connection to extension pipes 26 for remote discharge of the substance 6 over wider areas. This is illustrated in FIG. 5 and in order to improve the transportation, a separate pump station 27 is arranged outboard of the ship 5.

Figure 6A:
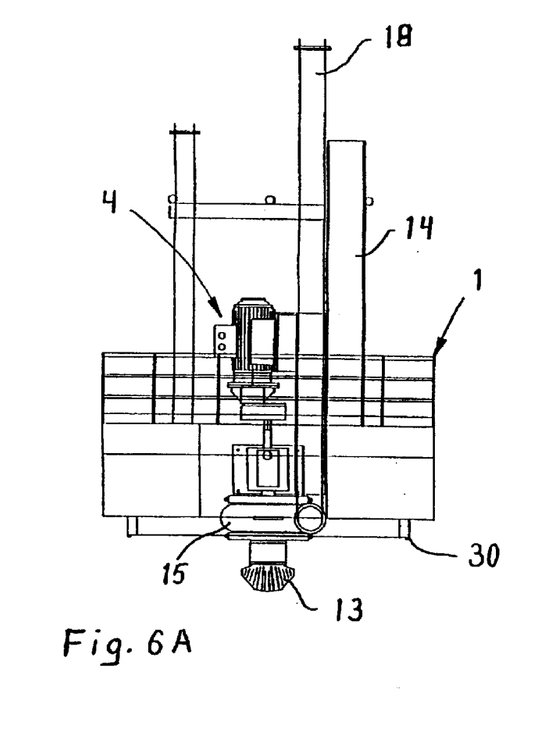
FIGS. 6A–6C illustrate schematically the float with installed pump station, and show three different states of operation; loading, maintenance and unloading respectively.
Figure 6B:
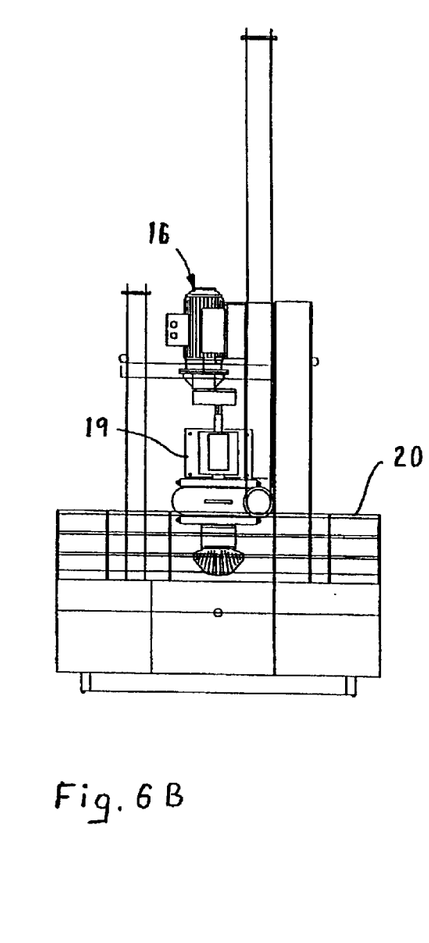
Figure 6C:
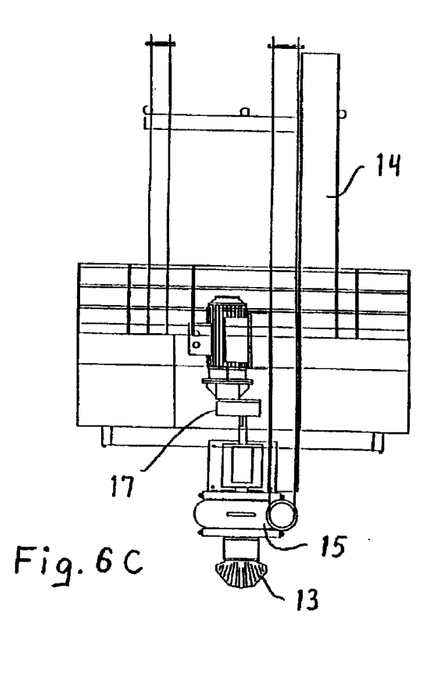

FIGS. 6A–6C show the combined float 1 and the pump station 4. As it appears from FIG. 6A, the float 1 is flat bottomed and has handrails 20 so that one or more persons can stay there while the float 1 is in action. To the float 1 a guiding column 14 is stationary mounted in respect of the float 1. The entire pump station 4 is assembled to a beam 18 that can be elevated or lowered, which movements are guided by the guiding column 14. A motor 16 is mounted to the beam 18. A pump 15 is also mounted to the beam 18. The motor 16 is connected to the pump 15 via a transmission 17 and a support 19. In operation, the motor 16 will thus be driving the pump 15 at a predetermined speed and feeding rate. The suction 13 of the pump 15 is located underneath the pump housing. The pump 15 can be a standard mud/sand pump corresponding to those that are used for removing soil and sand on the seabed. Further, a number of nozzles 30 can be arranged at the bottom of the float 1. The nozzles 30 can be activated in order to direct water jets against the substance if it has settled too much and hardened.

As it appears from FIGS. 6A–6C, the pump station 4 can be elevated or lowered in respect of the float 1. This is a material feature in order to adapt the equipment to the different situations that appear, like loading, maintenance and unloading. All the states are illustrated in FIGS. 6A, 6B and 6C respectively. Further, the suction 13 can be equipped with a cutter head, which is able to tear loose the substance if this has settled too much to come loose in other ways.

Figures 7A, 7B, 8:
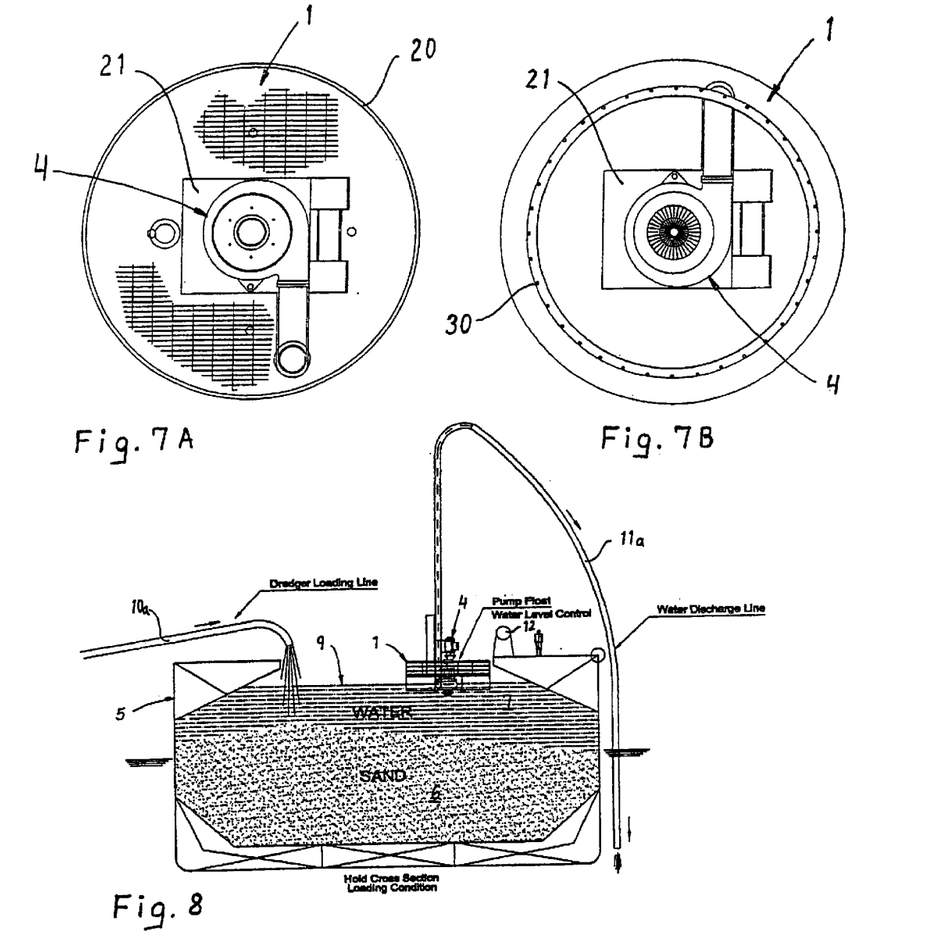
FIG. 7A illustrates schematically the float according to FIG. 6 viewed from above.
FIG. 7B illustrates schematically the float according to FIG. 6 viewed from below.
FIG. 8 illustrates schematically a cross section through the cargo hold of the ship hull in a situation during loading of sand and water.

FIG. 7A shows the float 1 from above and the pump station 4 is centrally arranged on the float 1. A moon pool 21 is defined in the float 1 for elevating or lowering of the pump station 4 through the moon pool.

FIG. 7B shows the float 1 viewed from below and illustrates how an array of nozzles 30, which are dedicated for jetting loose the substance that has hardened during the transportation, can be arranged.

It is to be understood that it is possible to use a pump station 4 in which the suction 13 only can be elevated or lowered, while the motor 16 and the pump 15 are stationary. The suction 13 can be a telescopically arranged unit, which can be extended or retracted in respect of the pump station 4.

A loading operation is shown in FIG. 8. A mixture of sand and water is brought onboard via the pipeline 10a and down into the cargo hold 2. The sand 6 settles and the water is forced up. The float 1 and associated pump station 4 are now utilised only to pass water having as little sand content as possible outboard again. This take place via the discharge pipeline 11a.

Figure 9A:
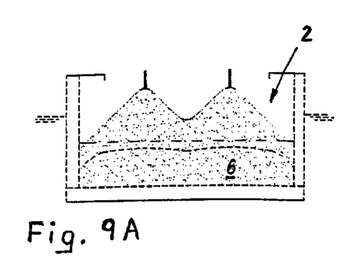
FIGS. 9A–9B illustrate schematically, from the side and above, how more coarse sand typically pile up into crests during a loading operation of the bulk carrier.
Figure 9B:
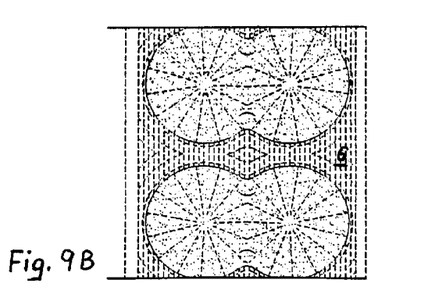

As mentioned, the substance may form crests T during loading as illustrated in FIGS. 9A and 9B. This is in particular true for coarser sand having relatively high angle of repose, towards 45 degrees. By finer sand the angle of repose is far less and for mud or soil it is almost absent. For mud having a degree of sand content, a washing effect of the sand is possible by suitable adjustments of the water layer and the currents in the layer. In this way the fine matters are held suspended in the water and are passed outboard again with the discharge water from the pumps 15.

Separate generator assemblies can be used and installed on the ship deck close to the pumps if the power supply on board is not sufficient.

During transportation between the different destinations, the substance is attempted, in largest possible extent, to be covered with a suitable water layer 7 in order to hamper too hard settling of the substance or sand 6.

A float 1 and pump station 4 can be deployed for each cargo hold 2 to obtain a maximum efficiency. Alternatively, two or more assemblies of float/pump station are available and can be transferred between the cargo holds 2 if an overall consideration of the economy dictate so.

An unloading operation will now be described with reference to FIGS. 2, 3 and 4. The suction 13 of the sand pump is lowered to about 1,5 meter beneath the bottom 8 of the float 1—see FIG. 6C. The float 1 is moved in a zigzag pattern on the surface while the pump 15 is sucking out sand 6 and water in a predetermined volumetric ratio. If necessary, the nozzles 30 are activated. The key to efficient loading is to maintain an optimal water layer 7 for the substance 6 to be easy to suck out and still keep a high as possible content of solid substance in the mixture being pumped out. The sand pump 15 delivers a mixture of water/sand in a volumetric ratio close to that for a mud pump, i.e. 70/30 to 60/40. This means that the water supply through the replenishing pipe 10 have to be between 60 and 70% of the capacity of the sand pump 15.

The level of the water and the thickness of the water layer are controlled by an external pump 26 for replenishing of water. At the latest step of the unloading operation the ship can be tilted to about two degrees to enable the pump suction 13 to suck out the remaining sand 6 at a for-and-aft side of the cargo hold 2.

As mentioned, a cutter head can be put on the suction 13 if the substance has hardened too much. This is extensively utilised equipment that is often used for removing soil and mud on the seabed.

The pump station 4 is elevatable within the hatch opening 21. The pump station 4 is elevated to a high level for maintenance purposes. The guiding column 14 and the beam 18 with associated levelling mechanisms may be standard commercial equipment. It may be manually or electrically powered. The suction 13 of the pump 13 is adjustable at such a height in respect of the float 1 that an optimal yield is given, which means at a high level for discharge pumping of water while loading, and at a low level while sand is unloaded.

A loading sequence is now to be described with reference to FIG. 8. The external pump 26 delivers a mixture of water and sand 6 to the cargo hold 2 via the loading pipeline 10a. The volumetric ratio between water and sand 6 is normally between 70/30 and 60/40. The discharge pump 15 of the float is now located at the opposite end of the cargo hold 2 in respect of the outlet of the loading pipeline 10a. The discharge pump 15 is now used to control the maximum water level in the cargo hold 2. The water layer 7 is now kept deeper for the sand to be given reasonable chance to settle and thus achieve that as little sand as possible is passed outboard again through the discharge pump 15 and the discharge hose 11a. The relatively large area of the cargo hold 2 combined with the capacity of the loading pipeline 10a and the discharge hose 11a and the distance between the two, maintains these parameters. At high soil content in the sand 6, different heights can be more optimal if a desire is present to pass as much soil as possible outboard again. The water level can be controlled by shifting the discharge pump off and on or by throttling the outgoing water flow in the discharge hose 11a. The operation may be monitored locally or by CCTV and controlled from the bridge of the ship.

We claim:

1. A method for unloading a solid substance having a high degree of water content from a cargo hold of a bulk carrier, the water content of the solid substance being such that a layer of water is formed above at least portions of the solid substance, the method comprising the steps of:
   a) providing a pump seated on a float that is freely moveable on the layer of water over the solid substance, the pump having a suction inlet that is projected into the water and solid substance and an outlet that is projected out of the cargo hold;
   b) pumping water and solid substance out of the cargo hold in a predetermined volumetric ratio; and
   c) feeding water into the cargo hold at a volumetric rate substantially the same as the volumetric rate of water being pumped out of the cargo.

2. The method according to claim 1, wherein the volumetric ratio of water and solid substance being pumped out of the cargo hold is between 70:30 and 60:40.

3. The method according to claim 1, wherein the suction inlet of the pump is moveable in a substantially vertical lane with respect to a surface of the float adjacent the water layer, and step b further comprises adjusting the movement of the suction inlet to adapt the projection of the suction inlet such that a predetermined volumetric ratio of solid substance and water is maintained.

4. The method according to claim 1, wherein the float includes at least one of a cutting means or water jetting means, and wherein step b further comprises activating at least one of the cutting means or water jetting means to loosen the solid substance adjacent to the suction inlet of the pump.

* * * * *

UNITED STATES PATENT AND TRADEMARK OFFICE
CERTIFICATE OF CORRECTION

PATENT NO.    : 6,575,692 B2
DATED         : June 10, 2003
INVENTOR(S)   : Vatne et al.

It is certified that error appears in the above-identified patent and that said Letters Patent is hereby corrected as shown below:

<u>Column 6,</u>
Line 43, delete the word "lane" and insert the word -- plane --

Signed and Sealed this

Twenty-ninth Day of July, 2003

JAMES E. ROGAN
*Director of the United States Patent and Trademark Office*